United States Patent [19]

Anderson et al.

[11] 4,105,348
[45] Aug. 8, 1978

[54] BUILDING COMPONENTS

[75] Inventors: Edwin V. Anderson; Joseph A. Mack, both of Glenview, Ill.

[73] Assignee: AMCO Engineering Company, Chicago, Ill.

[21] Appl. No.: 805,022

[22] Filed: Jun. 9, 1977

[51] Int. Cl.$^2$ ............................................. F16B 12/20
[52] U.S. Cl. .................... 403/172; 52/280; 211/182; 312/140; 312/257 R; 403/295; 403/329
[58] Field of Search ................ 211/182; 403/171, 172, 403/176, 292, 329; 52/280; 312/264, 140, 257 R

[56] References Cited

U.S. PATENT DOCUMENTS

| | | | |
|---|---|---|---|
| 3,087,768 | 4/1963 | Anderson et al. | 403/217 X |
| 3,255,721 | 6/1966 | Peterschmidt | 211/182 X |
| 3,272,582 | 9/1966 | Anderson et al. | 52/280 X |
| 3,726,551 | 4/1973 | Levenberg | 403/172 |

Primary Examiner—Werner H. Schroeder
Assistant Examiner—Conrad L. Berman
Attorney, Agent, or Firm—Dominik, Knechtel, Godula & Demeur

[57] ABSTRACT

Building components are disclosed for constructing of frames, enclosures, and the like, comprising hollow edge struts all of uniform cross section, with the ends of each edge strut providing a female joint. Interlocking members are provided having a central member with a plurality of legs extending outwardly from the central member and at fixed angles to each other, the legs each defining a male member adapted to be inserted in said female joint. The legs have locking clip recesses formed therein in at least two adjacent surfaces of the legs, the locking clip recesses spanning substantially the entire width and length of the surfaces of the legs. An abutment shoulder is formed at the central member and end of the locking clip recess which the edge strut butts up against when installed. Locking clips are provided having arms corresponding in number, and disposed within the locking clip recesses formed in the legs are inserted within the locking clip recesses before the edge struts are interlocked with the legs. The arms on each of the locking clips have a plurality of upstanding locking tabs formed therein to increase the strength of joints. The edge struts are cut to a specific length and interlock together by means of the interlocking members to form frames, enclosures, and the like.

10 Claims, 16 Drawing Figures

U.S. Patent  Aug. 8, 1978  Sheet 1 of 2  4,105,348
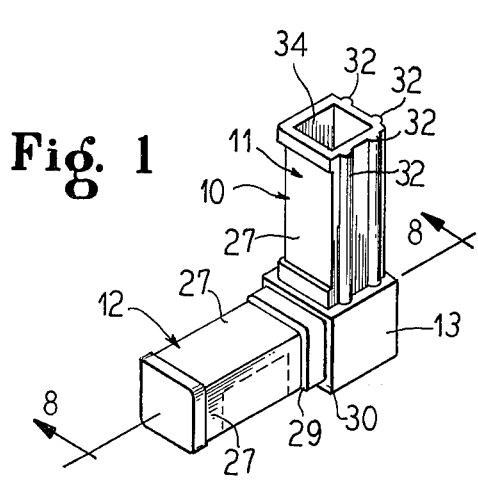
Fig. 1
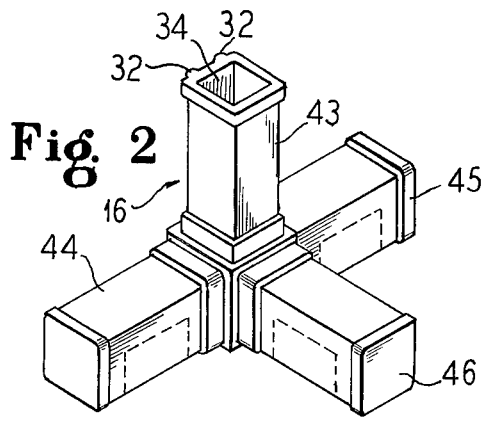
Fig. 2
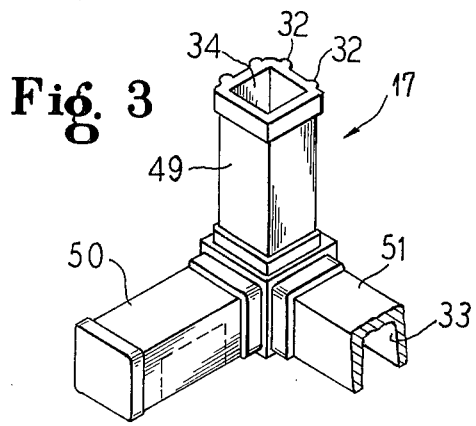
Fig. 3
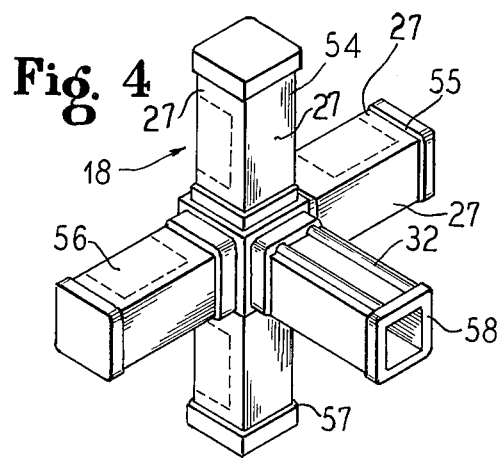
Fig. 4
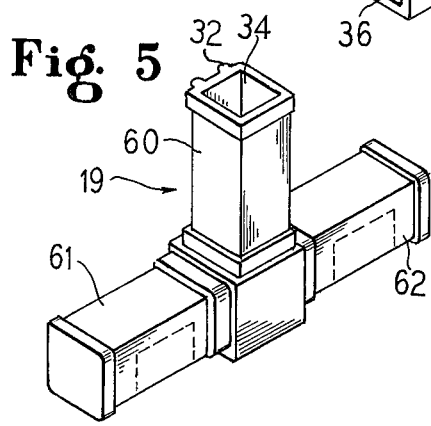
Fig. 5
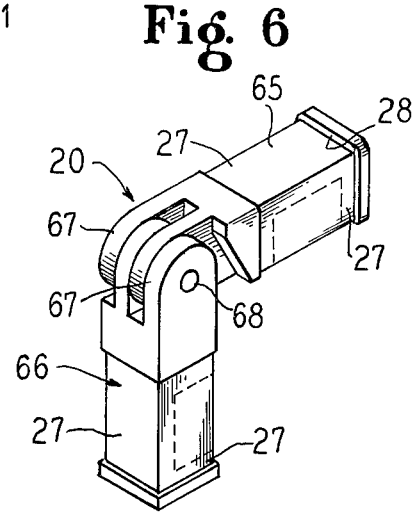
Fig. 6
Fig. 7

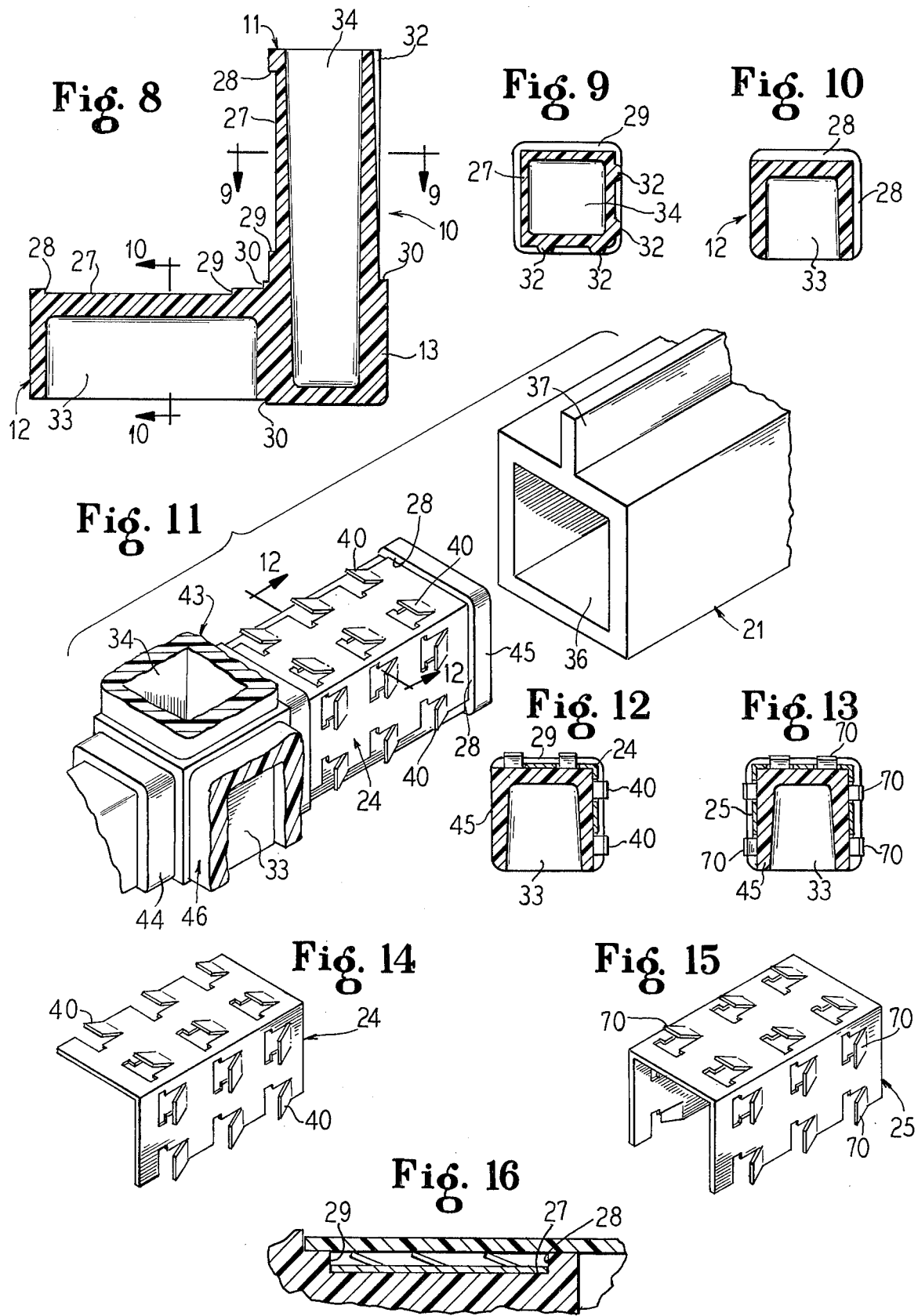

BUILDING COMPONENTS

BACKGROUND OF THE INVENTION

This invention relates to building components for constructing cabinets, test benches, divider walls, book shelves and the like.

Building components of the above generally described type are disclosed in U.S. Pat. Nos. 3,087,768 and 3,272,582, both of which are assigned to the assignee of the present invention. The building components of these patents are extremely versatile and have been accepted by both craftsmen and the "do it yourself" handyman because of the ease and the speed in which objects such as those mentioned above, as well as a whole host of other different objects, can be constructed. Because of this acceptance, additional development work has and is being made to further improve the construction of these building components, to provide still additional advantages.

In U.S. Pat. No. 3,087,768, the legs of the building components are provided with locking plate pockets for receiving locking plates of spring steel or other yieldable or resilient material. These locking plates function to secure edge struts and the like to the legs of the building components. A number of barbs can be provided in the locking plates to further strengthen the formed joints. The length of the locking plates preferably is slightly more than the length of the locking plate pockets so that the locking plates can be removably held within the pockets during assembly by the pressure fit thereof, and so that they are deformed when an edge strut is placed over them. While this structure of the locking plates and the pockets associated with them is generally good and provides a relatively strong joint, the rigidity of the article formed with the building components is susceptible of improvement. In addition, some difficulty is experienced due to the locking plates popping out of the pockets during assembly. This difficulty discouraged the use of the locking plates by many since the party assembling the joint needed three hands to do the job. Also, in many cases, these locking plates were lost when they popped out of the pockets, hence a waste of material resulted. Relatively expensive molds also are required to fabricate the pockets within the legs, for the locking plates.

The structure disclosed in U.S. Pat. No. 3,272,582 eliminated several of the above-mentioned objectionable features of the locking plates and the locking plate pockets. In this latter patent, the construction of the locking plates is modified so that the locking plates have a body portion which seats within a locking plate pocket and which has a raised flange on each of the opposite sides thereof which seats or rests on the surface of the legs. These locking plates, as fully described in said patent, provide numerous improvements in the joints formed between the legs of the building components and the edge struts, however, the use of them fails to improve rigidity to the desired extent or to eliminate the need of the relatively expensive molds required to form the pockets in the legs. Also, the same difficulty of the locking plates falling out of the pockets during assembly is experienced.

SUMMARY OF THE INVENTION

Building components are now provided which include, generally, a length of hollow rectangular shaped building strut and a number of differently shaped interlocking members for affixing these lengths of building struts together in a fashion such as to construct cabinets, test benches, divider walls, book shelves, and the like. The interlocking members include a knuckle joint and a number of fixed members each of which has two or more legs which are horizontally aligned or are at angles of 90° with respect to one another. There is a central member which is slightly larger than the cross section of the legs so as to provide an abuttment shoulder which results in a flush joint when an edge strut is slipped over the legs and abutted against the shoulders.

The legs have two or more locking clip recesses formed in two of the adjacent surfaces thereon, the length and width of the clip recesses substantially the entire area of the leg surface. The legs are of tubular construction to create a substantially lighter interlocking member while still retaining the strength and rigidity required. Other surfaces of the legs opposite the side having the locking clip recesses, have a pair of ribs formed thereon to secure the edge struts to the interlocking members.

The locking clip recesses formed in the legs receive a locking clip which is preferably frictionally retained within the locking clip recess by means of a press fit. The locking clips have barbs extending upwardly at an angle from the leg. When the edge struts are slideably extended over the legs of the interlocking member having the locking clip installed in the locking clip recess, the barbs are forced upwardly against the interior surface of the edge strut so that a secure frictional fit results. This securely locks the edge struts with the legs of the interlocking members.

Other interlocking members with more than two legs are also disclosed. Some utilize a U-shaped locking clip which is received by three locking clip recesses on one leg. The principle of utilizing barbs extending angularly upwardly to engage the building strut in a frictional fit is unchanged. The decision as to whether to use an L-shaped or U-shaped locking clip depends on its location in the completed structure. The legs which require the greatest amount of rigidity are adapted to receive a U-shaped locking clip which has a greater amount of barbs and, therefore, a greater surface area in frictional contact with the edge strut.

OBJECTS AND ADVANTAGES OF THE INVENTION

Accordingly, it is an object of the present invention to provide improved building components for constructing objects such as cabinets, test benches, divider walls, book shelves, and the like.

Another object is to provide improved building components of the above type constructed in a fashion such that there is more surface area for the locking clip to grip the interior of the mating edge strut.

Still another object is to provide improved building components of the above type which are cored in a fashion such that more economical molds can be used to form them and the castings can be more economically fabricated.

A still further object is to provide improved building components which are fabricated in a fashion such that improved locking clips can be used with them so that building struts can be more easily and more securely affixed to them.

A still further object is to provide improved building components which are fabricated in a fashion such that only a single locking clip is required on each of their legs to which building struts are to be secured.

A still further object is to provide improved building components and locking clips which are fabricated in a fashion such that greater dimensional tolerances can be compensated for.

Another object is to provide improved locking clips for use with building components for securing building struts to the legs of the building components.

Other objects of the invention will in part be obvious and will, in part, appear hereinafter.

DETAILED DESCRIPTION OF THE DRAWINGS

For a fuller understanding of the nature and objects of the invention, reference should be had to the following detailed description, taken in connection with the accompanying drawings in which:

FIGS. 1-6 each are perspective views of a number of differently constructed interlocking members exemplary of the present invention.

FIG. 7 is a perspective view of a building strut exemplary of the type which can be used with the interlocking members of FIGS. 1-6.

FIG. 8 is a sectional view taken along lines 8—8 of FIG. 1.

FIG. 9 is a sectional view taken along lines 9—9 of FIG. 8.

FIG. 10 is a sectional view taken along lines 10—10 of FIG. 8.

FIG. 11 is a partial perspective view of one of the interlocking members, partially broken away to illustrate its construction and further illustrating a locking clip exemplary of the present invention affixed to one of its legs and the manner in which a building or edge strut is affixed to the legs.

FIG. 12 is a sectional view taken along lines 12—12 of FIG. 11.

FIG. 13 is a sectional view similar to FIG. 12, illustrating the manner in which the U-shaped locking clip of FIG. 15 is affixed to the legs of the interlocking members.

FIG. 14 is a perspective view of an L-shaped locking clip exemplary of the invention.

FIG. 15 is a perspective view of a U-shaped locking clip exemplary of the invention.

FIG. 16 is a partial view of a leg of one of the interlocking members, sectionalized to illustrate how the locking clips seat within the locking clip recesses therein and how the barbs on the locking clips engage the struts.

Referring now to the drawings, in FIGS. 1-7 there are illustrated various ones of the different interlocking members 10 and 16-20, and an edge or building strut 21 formed in a manner exemplary of the invention. Using these building components in combination with various different types of edge or building struts, such as the edge strut 21, and side panels (not shown), a whole host of objects such as cabinets, book shelves, test benches, divider walls, and the like can be easily and quickly assembled, generally in the manner shown and described in the above mentioned U.S. Pat. Nos. 3,087,768 and 3,272,582.

The interlocking member 10, as shown in FIG. 1, includes two legs 11 and 12 which are disposed at angles of 90° with respect to one another and which extend from a central member 13. The central member 13 is slightly larger than the cross section of the legs 11 and 12 so as to provide abutment shoulders 30 of a width approximating the thickness of the walls of the edge or building struts, such as the edge strut 21. The flush joint is thereby effected when an edge strut is slipped over the legs and abutted against the shoulders 30, in a manner described more fully below.

The legs 11 and 12 each have two locking clip recesses 27 formed in two of the adjacent surfaces thereof which locking clip recesses 27 are substantially coextensive in area with the surfaces of the legs and are spaced so as to provide abutment shoulders 28 and 29 adjacent the terminal end of each of these legs and the central member 13, respectively. The underside of the leg 12 (as shown) has a recessed cavity 33 formed in it, as can be best seen in FIGS. 8 and 10. The remaining surface of the leg 12 is a planar surface, as can be best seen in FIG. 10. The leg 11 is of a tubular construction, having a cavity 34 formed in it which cavity further extends substantially through the central member 13, as can be best seen in FIGS. 8 and 9. A substantially lighter interlocking member 10 can be provided by forming these cavities 33 and 34 in the legs of the interlocking member and, furthermore, these cavities permit the interlocking member to be more easily and less expensively fabricated, in less expensive molds. This latter is due to the fact that by forming the cavities in the legs in the described fashion unidirectional coring can be used in the molds. The molds therefore are far less complex and hence much less expensive.

The other two surfaces of the leg 11 each advantageously have a pair of corrugations or ribs 32 formed thereon, which ribs 32 extend from the shoulders 30 of the central member 13 to the terminal end of the leg 11. These ribs 32 function in conjunction with the locking clips (described below) used to secure the edge struts to the interlocking members to compensate for variations in manufacturing tolerances so that greater dimensional tolerances can be tolerated.

These locking clip recesses 27 formed in the legs 11 and 12 of the interlocking member 10 are adapted to receive an L-shaped locking clip 24, of the type illustrated in FIG. 14. The locking clips 24 preferably are formed from a substantially sturdy, resilient material and have a number of barbs 40 (six as illustrated) formed in each of its two legs. The length of the locking clips 24 preferably and advantageously are substantially equal to or slightly greater than the distance between the abutment shoulders 28 and 29 formed by the locking clip recesses 27 so that the locking clips 24 can be press-fitted and retained within the locking plate recesses without the need of additional holding means, during assembly.

The barbs 40 can be easily and quickly die cut in the locking clips 24 and bent angularly upwardly at an angle such that the ends thereof are engaged by the interior surfaces of the edge struts, such as the edge strut 21, when the latter are slidably extended over the legs of the interlocking member 10. The resiliency of the material forcibly urges the barbs 40 upwardly so that they frictionally engage the interior surfaces of the edge struts, as illustrated in FIG. 16, so that the barbs will securely lock the edge struts with the legs of the interlocking members. Experience has shown that considerable force in the neighborhood of 300 pounds force is required to remove one of the edge struts, once the latter is assembled onto one of the legs of the interlocking members.

As indicated above, two surfaces of the leg 11 of the interlocking member 10 have locking clip recesses 27 formed in them for receiving the L-shaped locking clip 24 and the other two surfaces thereof have ribs 32 formed on them. Likewise, two surfaces of the leg 12 have locking clip recesses 27 formed in them for receiving an L-shaped locking clip 24 while the underside surface of the leg 12 has a recessed cavity 33 formed in it and the remaining surface thereof is a planar surface. This arrangement provides positive and true alignment between the legs of the interlocking member 10 and the edge struts slidably extended over and securely locked to them. This is due to the fact that the locking clips 24, or more particularly, the barbs 40 formed thereon, engage two of the interior surfaces of the edge strut and forcibly urge the edge strut against the planar surface so that its end edges are aligned with the abutment shoulders 30 of the central member 13 and a flush joint is provided. The forces exerted by the barbs on the two legs of the locking clips 24 are perpendicular to one another and at least two of the exterior surfaces of the edge struts are therefore forcibly urged into positive alignment with the abutment shoulders 30. Likewise, the ribs 32 on the two surfaces of the leg 11 functionally engage the interior surfaces of the edge strut slidably extended over the leg 11 and forcibly urge the edge strut into positive alignment with the abutment shoulders 30 of the central member 13 to provide a flush joint.

In FIG. 2, there is illustrated another interlocking member 16 having four legs 43–46. The legs 44–46 each are like the leg 12 of the interlocking member 10 in that they each have a locking clip recess 27 formed in two surfaces thereof and a recessed cavity 33 formed in the under surface thereof (as shown). The remaining side of each of these legs, as in the case of the leg 12 of the interlocking member 10, is a planar surface. These legs 44–46 like the leg 12 of the interlocking member 10 all are adapted to receive an L-shaped locking clip 24 for securely locking edge struts such as the edge strut 21, to them.

The leg 43 of the interlocking member 16, however, is of a slightly different construction than the leg 11 of the interlocking member 10. The leg 43 has a cavity 34 extending through it and substantially through the central member 13, as in the case of the leg 11, however, the leg 43 has a locking clip recess 27 formed in three of the adjacent surfaces thereof and a pair of ribs 32 formed on the remaining one of its surfaces. The ribs 32, as shown, are formed on the surface of the leg 43 which faces away from the leg 46. These three locking clip recesses 27 formed in the leg 43 of the interlocking member 16 are adapted to receive a U-shaped locking clip 25 of the type shown in FIG. 15. The locking clip 25, like the L-shaped locking clip 24, preferably is formed from a substantially sturdy, resilient material and a number of barbs 70 (18 as illustrated) are formed in each of its three legs or surfaces. These barbs 70 also are die cut in the locking clips 25 and are bent so as to extend angularly upwardly to frictionally engage the interior surfaces of an edge strut, in the manner described above, in the case of the locking clip 24.

In FIG. 3, it can be seen that the illustrated interlocking member 17 has three legs 49–51. Again, the legs 50 and 51 of the interlocking member 17 are identical in construction to the leg 12 of the interlocking member 10. The leg 49 of the interlocking member 17, like the leg 11 of the interlocking member 10, has a locking clip recess formed in two of its adjacent surfaces and a pair of ribs 32 provided on its other two adjacent surfaces, however, the position of the locking clip recesses and the ribs are displaced, in a counter-clockwise direction, one surface. More particularly, as can be best seen in FIG. 3, the ribs 32 are provided on the surfaces of the leg 49 facing away from the legs 50 and 51 and the locking clip recesses 27 are formed in those surfaces which face toward these legs. Accordingly, it can be seen from the description of the construction of the legs 49–51 of the interlocking member 17 that each of these legs is adapted to receive an L-shaped locking clip 24 of the type shown in FIG. 14.

In FIG. 4, there is shown still another interlocking member 18 having five legs 54–58. The legs 54–57, in this case, have a locking clip recess 27 formed in three of the adjacent surfaces thereof and a recessed cavity 33 formed in the other surface therefore. This recessed cavity 33 is formed in the other of each of these legs 54–57 which faces in the direction opposite to that of the direction in which the leg 58 extends. The leg 58 is of a hollow construction having a cavity 34 in it which extends through it and substantially through the central member 13 of the interlocking member 18, as in the case of the cavity 34 formed in the leg 11 of the interlocking member 10. Accordingly, even though the interlocking member 18 has five legs, unidirectional coring can still be employed in fabricating it. The leg 58 has a pair of ribs 32 formed on the top surface thereof (as illustrated) and its remaining three adjacent surfaces have a locking clip recess 27 formed in them. It therefore may be noted that each of the legs 54–58 of the interlocking member 18 has a locking clip recess 27 formed in three of its adjacent surfaces and, therefore, is adapted to receive a U-shaped locking clip 25 of the type shown in FIG. 15.

The interlocking member 19 shown in FIG. 5 has three legs 60–62. The legs 61 and 62 thereof are identical in construction to the leg 12 of the interlocking member 10 and the leg 60 thereof is identical to the construction of the leg 43 of the interlocking member 16 shown in FIG. 2. The interlocking member 19 therefore is adapted to have an L-shaped locking clip 24 affixed to each of its legs 61 and 62 and a U-shaped locking clip 25 to its leg 60.

In the case of each of the interlocking members 16–19, the locking clip recesses 27 are formed in the legs of these interlocking members so as to receive a locking clip of a construction such that the aligned surfaces, or joints, all are on the exterior of the structure formed using these building components. Also, the ribs 32 are provided on the various surfaces of the legs of the interlocking members 16–19 so as to provide a positive and true alignment between the edge struts affixed to the legs thereof and the central member 13 and so that flush joints are provided. Also, in each case, the legs having edge struts secured to them requiring the greatest amount of rigidity all are adapted to receive a U-shaped locking clip 25 which, of course, has a greater amount of barbs and therefore a greater surface area in frictional contact with the edge strut so that a more secure joint is provided. The legs, or joints, which do not require the same degree of rigidity each are adapted to receive or be secured by means of an L-shaped locking clip 24. Accordingly, the design of the interlocking members is such as to provide maximum rigidity where required while providing for a savings in material in those cases where the same degree is not required.

An interlocking member 20 in the form of a knuckle joint formed of two legs 65 and 66 is illustrated in FIG. 6. Each of the legs 65 and 66 of the interlocking member 20 have a pair of spaced apart flanges on one end thereof which are adapted to intermesh with the flanges on the opposite leg, so that the two legs can be angularly adjustably affixed together by means of a pivot pin 68. Each of these legs 65 and 66 have a locking clip recess 27 formed in three of the adjacent surfaces thereof and a recessed cavity 33 formed in the under surface (as shown) thereof. It is therefore apparent that the interlocking member 20 is adapted to have a U-shaped locking clip 25 affixed to each of its legs 65 and 66.

In FIG. 7, there is shown an edge strut 21 exemplary of the various differently constructed edge struts which can be used with the interlocking members 10 and 16–20 to fabricate different types of components of the type described above. It can be seen that the edge strut 21 is of a tubular construction having a cavity 36 substantially corresponding in size to the legs of the various interlocking members, so that the legs can be slidably extended into the cavity 36 of these edge struts. The outside dimensions of the edge struts also correspond to those of the central member 13 so that a flush joint is provided when the ends of the edge strut are abutted against the abutment shoulders 30 on the central member 13. The edge strut 21 is shown having an upstanding flange 37 integrally affixed to one of its walls. Flanges like the flange 37 can be used to affix cover plates, not shown, and the like to these edge struts for forming an enclosed cabinet or the shelves of a bookcase or the like. Numerous differently constructed edge struts can be used with the interlocking members, as shown and described in the above-mentioned U.S. Pats. 3,087,768 and 3,272,582.

FIG. 11 is a partial perspective view of the interlocking member 16 and the edge strut 21, the interlocking member 16 being partially broken away, to illustrate its construction and further to illustrate the manner in which the L-shaped locking clip 24 is affixed to the leg 45 thereof. It can be seen that the locking clip 24 seats within the locking clip recesses 27 formed in the two surfaces of the leg 45 and, even though it may be loosely received therein, it is far easier to retain the same on the leg while assembling the strut 21 with the interlocking member 16 by slidably extending the edge strut over the leg than in the case of the locking plates of the type described above and disclosed in the subject U.S. patents. However, as indicated above, preferably the length of the locking clips 24 and/or 25 is just slightly greater than the distance between the abutment shoulders 28 and 29 formed by the locking clip recesses 27 so that these locking clips can be press-fitted and thereby more securely retained within these locking clip recesses, during assembly. It is apparent that very little, if any, difficulty will be experienced with the U-shaped locking clip 25 since the latter can be effectively clamped about the leg of the interlocking member and, in such cases, there is very little likelihood that it will be dropped off during assembly.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. Building components for constructing frames, enclosures and the like comprising, hollow edge struts all of uniform cross-section, the ends of each said strut providing a female joint, interlocking members having a central member with a plurality of legs extending outwardly therefrom and at fixed angles to each other, said legs each defining a male member adapted to be inserted in said female joints and having locking clip recesses formed therein in at least two adjacent surfaces of predetermined ones of said legs, said locking clip recesses spanning substantially the entire width of said surfaces of said legs and substantially the entire length thereof so as to form an abutment shoulder adjacent the ends thereof and the central member, a locking clip having arms corresponding in number to and disposed within said locking clip recesses formed in said legs, said arms each having a plurality of upstanding locking tabs formed therein and having a length and a width co-extensive with those of said locking clip recesses, said edge struts each being cut to a specific length and interlocked together by means of said interlocking members to form said frames, enclosures and the like.

2. Building components, as claimed in claim 1, wherein, said interlocking members have locking clip recesses formed therein in two adjacent surfaces of predetermined ones of said legs, and wherein said locking clips are L-shaped having two arms disposed at right angles to one another.

3. Building components, as claimed in claim 2, wherein, at least one leg of said interlocking members has a locking clip recess formed in three adjacent surfaces thereof, and wherein said locking clip is U-shaped having three arms.

4. Building components, as claimed in claim 1, wherein at least one of said legs of said interlocking members has a leg cavity extending longitudinally through it from its end and the other legs thereof have a recessed cavity formed in their surfaces which face in a direction opposite to the direction of said leg cavity, whereby a lighter-weight interlocking member is provided and said interlocking members can be formed in molds using unidirectional coring.

5. Building components, as claimed in claim 4, wherein said leg having said leg cavity formed in it has rib means formed on at least one surface thereof.

6. Building components, as claimed in claim 1, wherein said locking clips are of a substantially sturdy, resilient material and said upstanding locking tabs are partially severed and are folded to extend angularly upwardly so as to frictionally engage the interior surface of said edge struts when the latter are assembled with said interlocking members.

7. An interlocking member for use with hollow edge struts of uniform cross-section and having ends providing a female joint to construct frames, enclosures and the like, said interlocking members comprising, a central member with a plurality of legs extending outwardly therefrom and at fixed angles to each other, said legs each defining a male member adapted to be inserted in said female joints and having locking clip recesses formed therein in at least two adjacent surfaces of predetermined ones of said legs, said locking clip recesses spanning the entire width of said surfaces of said legs and substantially the entire length thereof so as to form an abutment shoulder adjacent the ends thereof and the central member, a locking clip having arms corresponding in number to and disposed within said locking clip recesses formed in said legs, said arms each having a plurality of upstanding locking tabs formed therein and having a length and a width co-extensive with those of said locking clip recesses, said edge struts each being cut to a specific length and interlocked together by means of said interlocking members to form said frames, enclosures and the like.

8. An interlocking member, as claimed in claim 7, wherein said locking clip recesses are formed therein in two adjacent surfaces of predetermined ones of said legs, and wherein said locking clips are L-shaped having two arms disposed at right angles to one another.

9. An interlocking member, as claimed in claim 8, wherein at least one leg of said interlocking members has a locking clip recess formed in three adjacent surfaces thereof, and wherein said locking clip is U-shaped having three arms.

10. An interlocking member, as claimed in claim 7, wherein at least one of said legs of said interlocking members has a leg cavity extending longitudinally through it from its end and the other ones of the legs thereof has a recessed cavity formed in its surface which faces in a direction opposite to the direction of said leg cavity, whereby a lighter-weight interlocking member is provided and said interlocking members can be formed in molds using unidirectional coring.

* * * * *